United States Patent Office 2,975,105
Patented Mar. 14, 1961

2,975,105

FERMENTATION PROCESS

Hsing T. Huang, Fresh Meadows, N.Y., assignor to Chas. Pfizer & Co., Inc., Brooklyn, N.Y., a corporation of Delaware No Drawing. Filed Dec. 10, 1957, Ser. No. 701,728

6 Claims. (Cl. 195—47)

This invention is concerned with a new fermentation process for the production of L-valine. More particularly, it is concerned with the production of L-valine by the cultivation of an E. coli mutant.

L-valine is an important essential amino acid which is useful in human nutrition, nutrition studies and also in the synthesis of peptides which is of considerable current biological interest. Although DL-valine may be produced by chemical synthetic methods and numerous articles are found describing such processes, there is no reference in the literature to the preparation of L-valine by fermentation processes. The advantage of the present fermentation process lies in the fact that L-valine is selectively produced thus avoiding a mixture, i.e. DL-valine, from which L-valine must be separated by costly methods of resolution.

It has been surprisingly found that an auxotrophic mutant of E. coli which requires L-threonine for growth accumulates appreciable quantities of L-valine when cultivated in certain nutrient media. A living culture of this single auxotroph of E. coli has been deposited in the American Type Culture Collection, Washington, D.C., where it has been assigned the number ATCC 13,005. Such an auxotroph may be obtained by ultraviolet treatment followed by selection with penicillin of a wild strain of E. coli. This procedure is well known to those skilled in the art and commonly employed in the mutation of microorganisms.

The present invention provides an economical and practical method of preparing L-valine an important essential amino acid. The process of the present invention is accomplished by the aerated, deep-tank, i.e. submerged, fermentation of E. coli, ATCC 13,005 in a nutrient medium. Such nutrient media usually comprise a carbon source, a source of nitrogen and a source of metals required for the organism's growth, for example, potassium and magnesium. Lactose and sucrose are found to be particularly suitable carbon sources, the best results being obtained when they are employed. Other carbon sources which may be employed are sorbitol, glycerol and mannitol. When glucose is employed, extremely poor yields may be obtained. Crude beet molasses which usually contains from about 40% to about 60% by weight of sucrose is a particularly suitable carbon source. Excellent yields of L-valine are obtained when molasses is employed in the fermentation medium.

As mentioned above, the single auxotroph of this invention requires L-threonine for growth. A particularly effective source of this amino acid is cornsteep liquor although other sources of L-threonine may be employed, for example, acid hydrolyzed casein which contains approximately 5% by weight of L-threonine. The amino acid L-threonine may also be employed.

Usually, best results are obtained when employing as the carbon source beet molasses, sucrose or lactose or mixtures thereof. Usually, from about 20 to about 60 grams per liter of sucrose and/or lactose is found to give best results. Sufficient crude beet molasses to provide this range of sucrose concentration is also found to give almost identical results. For example, a beet molasses which is 40% by weight sucrose may be employed in amounts of from about 50 to about 150 grams per liter of nutrient medium to provide sufficient sucrose. Generally, from about 20 to 50 grams per liter of cornsteep liquor is found to provide sufficient L-threonine resulting in good yields of L-valine. When cornsteep liquor is not employed, L-threonine may be added to the nutrient medium in sufficient quantities to provide a concentration of from about 0.1 to 1 gram per liter. The yield of L-valine falls off with higher concentrations of L-threonine.

The fermentation may be carried out at a temperature from about 20° to about 40° C. although a temperature from about 25° to 40° C. is preferred. The fermentation process is best effected at a pH of from about 6.0 to 8.0. The medium is preferably aerated at a rate of from about ½ to 1 volume of air per volume of medium per minute and stirred vigorously. The optimum time for the process may be conveniently determined by paper chromatographic analysis of the L-valine content of the reaction medium, a procedure which is commonly employed in fermentation processes. Generally, time periods of from 40 to 60 hours give best results with no advantage being realized from longer periods of fermentation.

After the fermentation is complete L-valine may be isolated by standard procedures such as ion exchange methods. For example, the L-valine may be recovered by adjusting the pH of the medium to about two with hydrochloric acid, filtering and passing the filtrate through a strong cation exchange resin such as sulfonic acid resin, Amberlite IR–120 (Rohm and Haas Co.). The L-valine is eluted with dilute ammonium hydroxide, the eluate freed of ammonia by heating and L-valine obtained by evaporation of the eluate. The amino acid may be further purified by standard methods of recrystallization.

The following examples are given by way of illustration and are not to be construed as limitations of this invention many variations of which are possible within the scope and spirit thereof.

*Example I*

E. coli, ATCC 13,005 was inoculated from an agar slant into 1 liter of an inoculum previously sterilized at 20 pounds/square inch for 30 minutes having the following compositions:

| | G./l. |
|---|---|
| Sucrose | 10 |
| $K_2HPO_4$ | 1 |
| $(NH_4)_2HPO_4$ | 10 |
| $MgSO_4 \cdot 7H_2O$ | 0.1 |
| Acid-hydrolyzed casein | 2 |

The inoculum was incubated for 16 hours at 28° C.

A production medium was prepared having the following composition:

| | G./l. |
|---|---|
| Sucrose | 60 |
| $K_2HPO_4$ | 1 |
| $(NH_4)_2HPO_4$ | 10 |
| $MgSO_4 \cdot 7H_2O$ | 0.1 |
| Cornsteep liquor | 50 | pH adjusted to 7.5 with $NH_4OH$.

One hundred milliliters of the inoculum was added to 2 liters of the production medium in a fermenter flask previously sterilized by autoclaving for 20 pounds/square inch for 30 minutes. The broth was stirred at 1750 revolutions/minute and aerated at a rate of 1 volume of air per volume of reaction medium per minute at a temperature of 28° C. After 40 hours, the mixture assayed at 5 grams per liter of L-valine which was isolated by ion exchange treatment.

*Example II*

E. coli, ATCC 13,005 was inoculated from an agar slant into 1 liter of an inoculum as described in Example I.

One hundred milliliters of this inoculum was added to 2 liters of a production medium in a fermenter flask having the following composition:

| | G./l. |
|---|---|
| Crude beet molasses (containing 50% by weight of sucrose) | 120 |
| $K_2HPO_4$ | 1 |
| $MgSO_4 \cdot 7H_2O$ | 1 |
| $(NH_2)_2HPO_4$ | 20 |
| Cornsteep liquor | 50 | pH adjusted to 7.0 with $NH_4OH$.

The mixture was stirred and aerated as in Example I at 28° C. After 60 hours, the mixture assayed at 5 grams per liter of L-valine which was obtained by ion exchange treatment.

*Example III*

One hundred milliliters of an inoculum as prepared in Example I was added to 2 liters of a production medium previously sterilized at 20 pounds per square inch for 30 minutes, having the following composition:

| | G./l. |
|---|---|
| Lactose | 20 |
| $(NH_4)_2HPO_4$ | 10 |
| $MgSO_4 \cdot 7H_2O$ | 0.1 |
| L-threonine | 0.1 |
| $K_2HPO_4$ | 5 | pH adjusted to 7.6 with $NH_4OH$.

The mixture was stirred and aerated as in Example I at 28° C. After 40 hours, the mixture assayed at 2 grams per liter of L-valine.

*Example IV*

The process of Example II was repeated employing 60 grams of beet molasses and 30 grams of lactose as the carbon source in the presence of 1 gram per liter of L-threonine. After 48 hours, the mixture assayed at 5 grams per liter of L-valine.

*Example V*

The procedure of Example III was repeated employing 20 grams per liter of cornsteep liquor in place of L-threonine with equivalent results.

*Example VI*

The procedure of Example I was repeated employing 60 grams per liter of lactose in place of sucrose in the production medium with equivalent results.

*Example VII*

A production medium was prepared having the following composition:

| | G./l. |
|---|---|
| Crude beet molasses (containing 40% by weight of sucrose) | 50 |
| $K_2HPO_4$ | 1 |
| $MgSO_4 \cdot 7H_2O$ | 1 |
| $(NH_4)_2HPO_4$ | 10 |
| Cornsteep liquor | 20 | pH adjusted to 7.2 with $NH_4OH$.

One hundred milliliters of an inoculum as prepared in Example I was added to 2 liters of this production medium previously sterilized by autoclaving at 20 pounds/square inch for 30 minutes. The mixture was cultivated as in Example I. After 40 hours, the medium assayed at 3 grams per liter of L-valine.

What is claimed is:

1. A process for the production of L-valine which process comprises cultivating under submerged, aerobic conditions at a pH of from about 6.0 to about 8.0 E. coli, ATCC 13,005 in an equeous nutrient medium comprising a carbohydrate selected from the group consisting of sucrose, lactose, and mixtures thereof, a source of nitrogen, a source of magnesium, potassium, and trace metals in the presence of from about 0.1 to about 1 gram of L-threonine per liter of nutrient medium.

2. A process for the production of L-valine as claimed in claim 1 wherein the carbohydrate source is beet molasses containing from about 40% to about 60% by weight of sucrose.

3. A process for the production of L-valine as claimed in claim 1 wherein from about 20 to about 60 grams of sucrose per liter of nutrient medium is employed.

4. A process for the production of L-valine as claimed in claim 1 wherein from about 20 to about 60 grams of lactose per liter of nutrient medium is employed.

5. A process for the production of L-valine as claimed in claim 1 wherein the L-threonine is provided by utilizing from about 20 to about 50 grams of cornsteep liquor per liter of nutrient medium.

6. A process for the production of L-valine as claimed in claim 1 wherein the L-threonine is provided by utilizing acid-hydrolyzed casein containing about 5% by weight of L-threonine.

References Cited in the file of this patent

UNITED STATES PATENTS

| 2,771,396 | Casida | Nov. 20, 1956 |
| 2,841,532 | Kita et al. | July 1, 1958 |

OTHER REFERENCES

Journal of Bacteriology, vol. 65, pages 203 and 209 (1953).